United States Patent [19]

Valbert

[11] 3,715,388
[45] Feb. 6, 1973

[54] PROCESS FOR PREPARING GLYCOL ESTERS FROM ETHYLENE AND PROPYLENE

[75] Inventor: Jon R. Valbert, New York, N.Y.
[73] Assignee: Halcon International, Inc.
[22] Filed: March 1, 1971
[21] Appl. No.: 119,969

[52] U.S. Cl. ............260/497 R, 260/476 R, 260/469, 260/471 R, 260/615 B, 260/633
[51] Int. Cl. .................................................C07c 69/16
[58] Field of Search ...................260/497 R, 469, 476

[56] References Cited

UNITED STATES PATENTS 3,479,395  11/1969  Huguet ............................. 260/497 R
3,542,857  11/1970  Lutz ................................. 260/497 R

FOREIGN PATENTS OR APPLICATIONS 904,304   8/1962   Great Britain ................... 260/533 N Primary Examiner—Lorraine A. Weinberger
Assistant Examiner—Richard D. Kelly
Attorney—William C. Long, David Dick and Riggs T. Stewart

[57] ABSTRACT

Vicinal esters of ethylene glycol and propylene glycol are prepared by continuously reacting ethylene or propylene with molecular oxygen and monobasic carboxylic acids within an oxidation zone containing a liquid phase reaction medium. Selectivity of this liquid phase reaction is improved, without adverse effect upon reaction rate, by maintaining the concentration of the olefin within the liquid phase reaction medium at a level less than about 0.8 wt. percent.

13 Claims, No Drawings

PROCESS FOR PREPARING GLYCOL ESTERS FROM ETHYLENE AND PROPYLENE

BACKGROUND OF THE INVENTION

This invention relates to a continuous process for preparing vicinal esters of ethylene glycol or propylene glycol by the continuous liquid phase reaction of ethylene or propylene, molecular oxygen and monobasic carboxylic acids.

Belgian Pat. Nos. 738,104 and 738,463 described catalytic systems for the direct production of such esters from olefinically unsaturated compounds. More specifically, these patents describe the reaction of such compounds and molecular oxygen with carboxylic acids in the presence of variable valence metal cations and appropriate halogens or halogen-containing compounds.

These patents represent basic developments of great commercial interest which can be made even more attractive by increasing selectivity to the formation of the desired ester products. Desirably, such selectivity improvements should be attained without sacrifice of reaction rate in order to avoid increasing equipment sizes for given production capacities.

It has long been thought that rate of desired product formation could be increased most effectively by increasing the concentration of the olefin reactant in the liquid phase where the ester product is formed. It has further been taught that such rate increases could be obtained without sacrifice in selectivity. See, for example, Huguet, U.S. Pat. No. 3,479,395. Moreover, in other liquid phase olefin oxidation processes it is known that increasing the concentration of the olefin reactant in the liquid phase not only increases reaction rate but also is thought to increase selectivity. This is shown for the oxidation of olefins to carbonyl compounds, for example, in British Pat. No. 1,032,325, published on June 8, 1966, and is suggested by Clark et al. in British Pat. No. 1,026,597, published Apr. 20, 1966.

SUMMARY OF THE INVENTION

Very surprisingly, it has now been found that, in the reaction system with which this invention is concerned, the selectivity of the reaction whereby the olefin is converted to the desired ester products is increased when the concentration of the olefin in the liquid phase reaction medium is maintained at a lower level than heretofore thought desirable, i.e., below about 0.8 wt. percent. Moreover, the maintenance of olefin concentration at levels less than about 0.8 wt. percent in the liquid phase, which increases selectivity, causes little if any sacrifice in reaction rate and indeed may under some circumstances result in an increase in reaction rate. These phenomena are completely contrary to what might have been expected by analogy to other olefin oxidation processes and is clearly indicative of fundamental process differences between the process with which this invention is concerned and those known in the prior art.

The reaction system with which this invention is concerned relates to the production of monobasic carboxylic esters of $C_2$–$C_3$ vicinal glycols by the oxidation with molecular oxygen of ethylene or propylene in the presence of a monobasic carboxylic acid. The glycol moiety of the ester products of the process of this invention has a carbon structure corresponding to that of the olefin while the acyl moiety of the ester products corresponds to that of the monobasic carboxylic acid. The following chemical equation illustrates the primary chemical reaction involved in the process of this invention, but there is no intent to limit this invention to the specific embodiment illustrated.

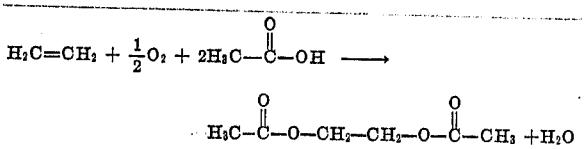

The illustrated reaction occurs within an oxidation zone in the presence of a liquid phase reaction medium comprising the carboxylic acid and dissolved olefin. In practice, the olefin (ethylene or propylene) and molecular oxygen are continuously introduced to the oxidation zone containing the liquid phase reaction medium wherein the reaction occurs.

DETAILED DESCRIPTION OF THE INVENTION

The technique of this invention requires that the concentration of the olefin in the liquid phase reaction medium be maintained at a level less than about 0.8 wt. percent in order to increase selectivity of the reaction to the formation of the desired ester products. Desirably the olefin concentration is maintained at a level less than about 0.6 wt. percent and preferably at a level less than about 0.4 wt. percent. The foregoing represent maximum concentrations in the liquid phase reaction medium. Minimum concentrations, on the other hand, do not appear to be especially critical so long as some significant amount of olefin is present within the liquid phase in order to achieve reasonable reaction rates. Accordingly, it is normally sufficient to maintain olefin concentrations in the liquid phase which are at least 0.01 wt. percent, more desirably 0.03 wt. percent and preferably at least 0.05 wt. percent, although olefin concentrations within the liquid phase can readily be less than the values recited.

Means for controlling olefin concentration in the liquid phase reaction medium include variations in reaction conditions, variations in gas feed concentrations and rates and, of course, combinations of these techniques. Increasing reaction temperature or reducing reaction pressure decreases the solubility in the liquid phase reaction medium of all gases and of necessity must (other conditions remaining constant) act to reduce the olefin concentrartion, while increasing pressure and/or decreasing reaction temperature increases olefin concentration. Decreasing the rate at which olefin is introduced to the concentration, liquid phase reaction medium (other factors being constant) also decreases olefin concentration in the liquid phase because, while greater contact time for absorption would appear to be provided, olefin partial pressure in gases exiting from the oxidation zone is actually reduced, thereby reducing the liquid phase olefin concentration. Similarly, decreasing the ratio of olefin to oxygen also decreases liquid phase olefin concentration, again because olefin partial pressure is thereby reduced.

Another method for adjusting liquid phase olefin concentration involves the introduction of an inert third component to the system or the maintenance of such a component therewithin. Such an inert functions to reduce the olefin concentration in the overall feeds, reduces absorption driving forces as well as partial pressure and hence reduces olefin concentration in the liquid phase. "Inert" in this context does not necessarily mean use of materials extraneous to the reaction system since reaction by-products, e.g., carbon dioxide, are entirely suitable for this purpose. Similarly, true inerts such as nitrogen, argon and the like can be used as also can light paraffins such as methane, ethane and propane.

Combinations of these methods can and normally would be used.

The process of this invention is a continuous one wherein olefin and oxygen are continuously introduced to the oxidation zone and therein continuously reacted with the carboxylic acid reactant.

The Reactants

As is apparent from the foregoing discussion, there are three reactants involved in the instant process. The first, of course, is molecular oxygen which can be supplied as such (i.e., in concentrated form, having an oxygen content of 85 mole percent or more) or can be supplied in the form of air or in the form of enriched air or diluted air. The second reactant is the olefin which, in accordance with this invention, can be ethylene or propylene or mixtures thereof. These reactants need not be specially purified and can contain those impurities normally found therein. For example, the ethylene can contain normal quantities (up to 10 mole percent) ethane, and the oxygen can contain nitrogen, argon, etc.

The third reactant is the monobasic carboxylic acid. Suitable acids are the monobasic lower aliphatic acids having from one to six carbon atoms per molecule. These include formic acid, acetic acid, propionic acid, butyric acid, isobutyric acid, the valeric acids and the caproic acids. Also suitable are the monobasic aromatic carboxylic acids such as benzoic acid, the naphthoic acids (both alpha and beta), the anthranilic acids and the phenanthranilic acids. The carboxyl group of the aromatic acids employed in the process of this invention is bonded directly to the nucleus of the aromatic ring. In addition, the aromatic acids may also contain nuclear alkyl substituent (one or more) having from one to six carbon atoms.

Of the foregoing acids, the ones most desirably employed are formic acid, acetic acid, propionic acid and benzoic acid. The use of benzoic and acetic acids is preferred, and acetic acid is the one most preferably employed.

The use of mixed acids is also contemplated within the scope of this invention. Of course when mixed acid reactants are employed, mixed ester products are obtained.

The carboxylic acid can be employed in any commercially available form, including the use of aqueous solutions thereof. It is preferred, however, to employ commercial acids having no more than 25 percent water, and especially less than 15 percent water, such as 90–98 percent acetic acid. The acids used can suitably contain the various organic and inorganic impurities normally associated with the various commercially available materials and, for purpose of this invention, such impurities can be allowed to remain or can be removed as one desires. Unreacted acid, containing impurities indigenous to the process can be recovered and recycled.

Reaction Products

The desired product of the process of this invention is a vicinal glycol diester, the glycol being either ethylene glycol or propylene glycol. The glycol moiety of this diester corresponds in structure to the olefin reactant or reactants. The acyl moiety of the ester corresponds to the monobasic carboxylic acid reactant or reactants. However, in the reaction, substantial amounts of valuable materials other than the diester are usually formed, valuable because they are precursors of the desired diester product. Such precursors include the glycol monoester, the glycol corresponding to the olefin itself (i.e., ethylene glycol and/or propylene glycol) and higher boiling ether-alcohols and ether-alcohol mono- and di-esters. Halogenated precursors are also formed, the halogen being introduced to the system as components of the catalyst system (hereinafter discussed). To illustrate the nature of these higher boiling materials, when the olefinically unsaturated compound is ethylene and the monobasic carboxylic acid is acetic acid, these materials include diethylene glycol, triethylene glycol and their mono- and di-acetate derivatives. To further illustrate, assuming the halogen to be bromine, the halogenated precursors would include ethylene bromohydrin, 2-bromoethyl acetate, 1,2-dibromoethane and brominated derivatives of the higher boiling materials.

The Liquid Phase Reaction Medium

The liquid phase reaction medium within the oxidation zone is the environment in which the ester formation reaction occurs. This medium contains the carboxylic acid reactant, the ester products of the reaction, precursors of the desired ester products of the reaction, reaction by-products, as well as, of course, the catalyst system employed. Essentially, some quantity of dissolved olefin reactant and dissolved oxygen are present. Normally the reaction medium will contain from 5–60 mole percent of carboxylic acid reactant, from 5–60 mole percent of reaction products including the desired diester product, monoester product, precursors for these materials and by-products. Also present therein will be the catalyst system employed (0.1–30 percent by weight), as well as the olefin, the concentration of which must be controlled in accordance with this invention and dissolved oxygen. Broadly, the olefin concentration will be from 0.01 percent to about 0.8 percent by weight of the liquid phase reaction medium, desirably from 0.03 percent to about 0.6 percent by weight of the liquid phase reaction medium and preferably from 0.05 percent to about 0.4 percent by weight of the liquid phase reaction medium.

The Catalyst System Employed

The process of this invention requires a catalyst system which is a variable valent metal cation plus at least one of bromine, chlorine, a bromine-containing compound or a chlorine-containing compound. Suitable catalyst systems for this reaction are set forth in co-pending Application Ser. No. 819,507 filed Mar. 24, 1969 and Ser. No. 762,978 filed Sept. 26, 1968. Especially preferred catalyst systems are those set forth in co-pending Application Ser. No. 31,262 filed Apr. 23, 1970. The disclosures of these applications are herein incorporated by reference.

The catalyst system disclosed in these co-pending applications combine a variable valent metal cation with at least one of bromine, chlorine, a bromine-containing compound or a chlorine-containing compound. The variable valent metal cation is a tellurium, carium, antimony, manganese, vanadium, gallium, arsenic, cobalt, selenium or silver cation or mixtures thereof. These cations can be supplied to the system in their elemental form and added to the oxidation zone as a fine powder or can be added in any form which, in solution or suspension under oxidation conditions, will yield at least some soluble metal ions. For example, the metal source can be the carbonate, oxide, hydroxide, bromide, chloride, lower ($C_1$-$C_3$) alkoxide (e.g., the methoxide), phenoxide or metal carboxylates wherein the carboxylate ion is the same or different from the acid reactant. In a preferred aspect, the metal is added as the oxide, hydroxide or salt of the acid reactant. Furthermore, the metal compound employed can contain impurities naturally associated with the commercially available compounds, and need not be purified any further.

The preferred systems, when using bromine or a bromine-containing compound, employ tellurium, cerium, antimony, manganese or vanadium with tellurium, cerium, antimony, and manganese being most preferred. For use with chlorine or a chlorine-containing compound, the preferred catalyst systems use cerium, manganese, arsenic, cobalt, copper, selenium or chromium; the more preferred being cerium, manganese, cobalt, copper and selenium with the most preferred being cerium, manganese and cobalt.

When it is desired to use a bromine or chlorine-containing compound in the reaction instead of bromine or chlorine itself, one can employ any compound capable upon oxidation or by other means, of producing bromide or chloride ions in solution. For example, one can use hydrohalic acids (gaseous or aqueous, preferably concentrated aqueous acid) any metal halide such as the alkali, alkali earth or heavy metal bromides or chlorides, (potassium bromide, calcium chloride, manganese bromide and the like) the metal bromides or chlorides corresponding to the variable valence cations or organo-chlorine and organo-bromine compounds such as alkyl tri-halides, lower aliphatic ($C_1$-$C_6$) halides (propylhalide, pentylhalide), cyclo lower aliphatic halides (cyclo-hexylhalide) or lower aliphatic dihalides (ethylene di-chloride, di-bromoethylene) all of which are considered for nomenclature purposes to be compounds capable of producing bromide or chloride anions. Also contemplated is the use of a mixture of two or more halogen-producing compounds, containing the same or different halogen, as well as mixtures wherein the cation of the halide compound can be the same or different from the cation of the other metal compound employed. The halogen employed can suitably contain impurities therein, normally associated with the commercially available halogen, and in the preferred aspect of this invention the commercially available materials are employed.

Of all the catalyst systems, that most preferably employed is a tellurium metal cation (supplied to the oxidation zone as the powdered metal, the oxide, the carbonate or in any one or more of the forms referred to above but most preferably as the oxide) in conjunction with a non-basic bromine source. The use of this especially preferred catalyst system enables the pH of the liquid phase reaction system to be maintained at a level less than 2.0 which further enhances yield and selectivity. As here used and throughout this specification, references to pH means the pH of a sample of the liquid phase reaction medium measured at 25°C after dilution with 10 parts of water (weight basis) per part of weight of reaction medium. The pH is controlled by supplying sufficient bromine from a non-basic bromine source. Suitable non-basic bromine sources include any of those referred to above except the alkali and alkaline earth metal bromides. For example, the non-basic bromine source can be $Br_2$, hydrobromic acid, a tellurium bromide, an organic bromide, or a metal bromide where the metal cation is not an alkali or alkaline earth metal. Suitable organic bromides include all the bromine derivatives of the olefin being oxidized and the reaction products. For example, in the oxidation of ethylene these include but are not limited to 1,2-dibromoethane, ethylene bromohydrin, 2-bromoethyl carboxylate and other bromine-containing derivatives of ethylene and including higher molecular weight ethers and the like. Similarly, in the oxidation of propylene, the organic bromides include 1,2-dibromopropane, propylene bromohydrin, 2-bromopropyl-1 carboxylate and other bromine-containing derivatives of propylene and including higher molecular weight ethers and the like.

Reaction Conditions

The various reactants employed in the oxidation reaction may be effectively used over a wide range of concentrations. The effective minimum concentrations of catalysts will depend upon temperature, residence time and the type of halogen expressed in wt. percent of halogen to total liquid phase within the oxidation zone and can be from 0.01 to 30 percent or higher, desirably from 0.1 percent to about 20 percent and especially from about 0.5 percent to about 10 percent. The concentration of total metal cation present expressed in terms of equivalents of cation per equivalent of halogen can suitably vary from about 1:0.01 to about 1:100, but desirably from about 1:0.2 to about 1:40 and preferably from about 1:1 to about 1:20. The temperatures maintained in the oxidation zone may vary from about 50°C to the bubble point of the liquid phase reaction mixture within the zone with temperatures from about 90°C to about 200°C being preferred. Total pressures within the oxidation zone can be sub-atmospheric, atmospheric, or super-atmospheric with pressure up to about 5,000 psia or higher being operable. Pressures from about 20 psia to about 1,000 psia are normally desired, while pressures from about 15 psia to about 1,000 psia and especially from about 50 psia to about 700 psia being particularly preferred.

While the mole ratio of oxygen to olefin fed to the system can be varied to assist in maintaining olefin liquid phase concentration, the mole ratio of oxygen to olefin is not critical and, therefore, any suitable ratios can be used. For example, such ratios as 1:1000 to 1:.001 may be used. Of course, care should be taken to avoid formation of flammable mixtures.

Reaction time, i.e., residence time within the reactor, can vary widely. Flow rates are preferably adjusted so that the rate of formation of product, measured as rate of formation of glycol diester, is from about 0.1 to about 10.0 gm-moles per liter of liquid phase reaction medium per hour.

As hereinbefore indicated, the process of this invention requires continuous operation with the olefin reactant and molecular oxygen reactant being continuously introduced to the oxidation zone and being continuously reacted therewithin. The carboxylic acid reactant normally would also be fed continuously to the oxidation zone, and the liquid phase reaction medium would normally be continuously withdrawn therefrom, the liquid phase reaction medium containing the desired ester products and their precursors. However, it should be noted that the carboxylic acid reactant can be introduced intermittently and the liquid phase reaction medium, containing the reaction products, can be withdrawn intermittently without thereby rendering the process other than a continuous one. The reaction can conveniently be carried out in one reaction vessel although, if desired, the reaction can be carried out in two or more vessels connected in series. Intermediate products such as, for example, ethyl bromide, 1,2-dibromoethane and/or 2-bromoethyl carboxylate or other ethylene glycol derivatives can suitably be recycled into the system to yield additional ethylene glycol ester. High boiling ether-alcohols and their derivatives can also be recycled. Similarly, in the oxidation of propylene, the propylene dibromide and/or propylene monobromo carboxylate or propylene glycol derivatives can suitably be recycled into the oxidation zone to yield additional propylene glycol esters.

The esters prepared by the process of this invention find ready use as solvents and plasticizers. For example, ethylene glycol diacetate may be used as a solvent or an intermediate to prepare ethylene glycol or vinyl acetate. Similarly, ethylene glycol dibenzoate may be used as a solvent or intermediate to prepare ethylene glycol or vinyl benzoate. Correspondingly, propylene glycol diacetate may readily be converted to propylene glycol or to allyl acetate.

EXAMPLES

The following examples are presented to further illustrate this invention but are not intended to limit the scope thereof. Unless otherwise state, all parts and percents in the description of the examples are on a weight basis.

The following examples are carried out in a 1-gallon, glass-lined autoclave equipped with an agitator. Associated with the autoclave is a condenser to which vapors generated in reaction are conducted. Materials condensed within the condenser are separated from non-condensed gases, and the condensate is admixed with liquid product withdrawn from the reactor. Further details of the arrangement of the apparatus employed will be apparent from the following description of the examples.

EXAMPLE I

A mixture containing 86.7 wt. percent of acetic acid, 7.3 wt. percent of 2-bromoethyl acetate, 2 wt. percent of tellurium dioxide and 4 wt. percent water is prepared and charged to the autoclave at a rate of 1,600 grams per hour. Also charged to the autoclave is a gas mixture of 90.9 mole percent ethylene and 9.1 percent oxygen. This gas mixture is continuously introduced through an open-ended tube exiting just below the agitator blade within the autoclave. Reaction temperature is maintained at 160°C and pressure is maintained at 415 psia.

The rate of addition of the gas mixture is adjusted to maintain the reaction pressure and, after 4.8 hours of running, steady state operation is achieved. Analysis of the liquid phase reaction medium within the autoclave indicates the ethylene concentration in the liquid phase reaction medium to be 0.70 wt percent. The liquid phase reaction medium has the following composition:

| | |
|---|---|
| Ethylene Glycol Acetate Precursors (expressed as ethylene glycol diacetate) | 43.1 wt. % |
| 2-bromoethyl acetate + ethylene bromohydrin + 1,2-dibromoethane | 2.3 wt. % |
| water | 3.6 wt. % |

Liquid product is withdrawn from the autoclave via an overflow pipe so that a constant inventory of liquid phase reaction medium is maintained within the autoclave. This liquid product is admixed with the condensed portion of the vapors withdrawn from the autoclave and then analyzed. These analyses indicate that the average rate of ethylene converted is 0.79 gm-moles/hr/liter of liquid phase reaction medium. The selectivity (meaning the moles of diester product and precursors thereof formed per mole of ethylene consumed) is found to be 80.6 mole percent. This selectivity value includes not only the ethylene glycol diacetate formed but also the total of the ethylene glycol monoacetate, 2-bromoethyl acetate, ethylene bromohydrin, ether-alcohols and ethylene glycol formed in the reaction since these are all precursors of the desired diester. The selectivity value excludes the amount of 2-bromoethyl acetate charged. The following by-products, expressed as moles of by-product per 100 moles of ethylene consumed, are obtained: .

| | |
|---|---|
| acetaldehyde | 0.7 |
| 1,4-dioxane | 2.6 |
| 1,3-dioxolane | 2.5 |
| formaldehyde | 1.8 |
| high boilers | 7.6 |

The term "high boilers" refers to materials having boiling points higher than that of ethylene glycol diacetate and includes materials which are ethylene glycol diacetate precursors.

EXAMPLE II

Example I is repeated except that the gas feed contains, on a molar basis, 36.4 percent ethylene, 9.1 percent oxygen and 54.5 percent nitrogen. Temperature and pressure are the same as in Example I. After steady state operations are achieved, analysis indicates that the liquid phase ethylene concentration is 0.27 wt. percent. The rate and selectivity found are respectively 0.82 gm-moles/hr/liter and 85.7 percent, both values being expressed on the same basis as that used in Example I. By-products formed, again on the same basis in Example I, are:

| | |
|---|---|
| acetaldehyde | 0.6 |
| 1,4-dioxane | 2.0 |
| 1,3-dioxolane | 1.9 |
| formaldehyde | 0.9 | high boilers 4.8

Control A

The procedure of Examples I and II are repeated at 160°C. and a total pressure of 525 p.s.i.a. Here the gas feed contains, on a molar basis, 7 percent oxygen and 93 percent ethylene which provides an oxygen partial pressure equivalent to that employed in both Examples I and II and gives safe operation. The gas feed rate is adjusted to maintain the indicated pressure. After steady state operation is attained, analysis indicates the liquid phase ethylene concentration to be 0.9 wt. percent.

Rate and selectivity (expressed on the same basis as used in Example I) are respectively 0.78 gm.-moles/hr.liter and 77.9 mol percent.

A comparison of the results of the above Examples with the results of the Control clearly establishes the surprising nature of the invention. Reduction in olefin concentration provides increased selectivity without sacrifice in rate. It should also be noted that reactor liquid phase composition in Examples I, II and the Control are, with the exception of olefin concentration, substantially identical as also is oxygen concentration which further reinforces the point made herein; the only significant factor changed is the olefin concentration. Moreover, since in liquid phase oxidations, conversion is more appropriately defined as product concentration in the reaction liquid, and in the foregoing examples and in the Control, this is substantially unchanged, the comparison made and the conclusions drawn are not attributable to normal conversion versus selectivity relations.

When Examples I and II are repeated with differing gas feed compositions and/or pressures so as to maintain liquid phase ethylene concentrations of 0.53 wt. percent, 0.42 wt. percent, 0.13 wt. percent, 0.08 wt. percent, and 0.05 wt. percent, similar results are observed. Selectivities are substantially similar to that of Examples I and II and even increases somewhat as concentration declines. No substantial decrease in reaction rate is observed. When Examples I and II and Control A are repeated at temperatures of 100°, 120° and 180°C, substantially similar trends are observed.

Further, when the foregoing Examples and the Control are repeated employing formic acid, benzoic acid and propionic acid, similar results are again observed.

Control B

The procedure of Examples I and II is repeated for the oxidation of propylene in the apparatus employed in the prior examples. This example is a control, not illustrative of the invention.

A mixture containing 86.1 wt. percent acetic acid, 4.4 wt. percent of 1,2-dibromopropane, 7.5 percent of aqueous hydrobromic acid (48 wt. % HBr) and 2.0 wt. percent of tellurium dioxide is prepared and charged to the autoclave of the prior examples at a rate of 1,800 grams per hour. Also charged to the autoclave is a gas mixture of the following composition, expressed on a mole basis: 10 percent oxygen, 36.6 percent propylene and 53.4 percent nitrogen. Gas flow rate is adjusted to maintain a total pressure of 315 psia and temperature is maintained at 150°C.

After 3.3 hours of operation, analyses indicate steady state operation to have been achieved and the liquid phase reaction medium is found to contain 0.9 wt. percent propylene and a total of 14.4 wt. percent of propylene glycol diacetate plus its precursors, expressed as propylene glycol diacetate. The steady-state propylene conversion rate is found to be 0.56 gm-moles/hr/liter of liquid phase reaction medium and the selectivity is found to be only 70 percent. As in the prior examples, the selectivity value refers to the moles of the diester product and its precursors formed per mole of propylene consumed, corrected so as not to include in the selectivity determination the amount of 1,2-dibromopropane in the feed.

EXAMPLE III

In this example, which is illustrative of the invention, Control B is repeated except that the gas feed has the following composition, on a molar basis: 10 percent oxygen, 10 percent propylene, 10 percent nitrogen and 70 percent ethane. The temperature used is again 150°C. and the gas feed rate is adjusted to again maintain a total pressure of 315 psia. After steady state operation is achieved, the propylene concentration in the liquid phase reaction medium is measured and found to be 0.25 wt. percent. The propylene conversion rate and selectivities obtained are respectively 1.07 gm-moles/liter/hr and 93.0 percent, both expressed on the same basis as used in Control B.

It is surprising to note that despite the lower olefin concentration in Example III when compared with that of Control B, both rate and selectivity dramatically increase.

The similar trends are observed when Control B and Example III with formic acid, propionic acid, benzoic acid and p-toluic acid. Again similar trends are observed when these two examples are repeated at temperatures of 90°, 100° and 190°C. Examples similar to Example III conducted at differing total pressures to give propylene concentrations in the liquid phase reaction medium of 0.4 wt. percent and 0.05 percent display similar conversion rates and selectivities.

What is claimed is:

1. In a process for the continuous production of monobasic carboxylic acid diesters of a $C_2$ vicinal glycol by the continuous oxidation with molecular oxygen of ethylene in the presence of a variable valence metal cation selected from at least one member of the group consisting of tellurium, antimony, vanadium, gallium, arsenic, selenium and silver and at least one of bromine, chlorine, a bromine-containing compound yielding bromide ions during reaction of a chlorine-containing compound yielding chloride ions during reaction, said oxidation being conducted within an oxidation zone in the presence of a liquid phase reaction medium comprising the carboxylic acid and dissolved ethylene, the improvement which comprises: maintaining the concentration of ethylene in the liquid phase reaction medium at a level less than 0.8 wt. percent.

2. A process in accordance with claim 1 wherein the acid is acetic acid.

3. A process in accordance with claim 1 wherein the olefin concentration is maintained at a level less than 0.6 wt. percent.

4. A process in accordance with claim 1 wherein the olefin concentration is maintained at a level below 0.4 wt. percent.

5. A process in accordance with claim 1 wherein the olefin concentration is maintained at a level between 0.01 wt. percent and about 0.8 wt. percent.

6. A process in accordance with claim 1 carried out in the presence of tellurium as the variable valence cation and in the presence of bromine or a bromine-containing compound.

7. A process in accordance with claim 6 wherein the acid is acetic acid.

8. In a process for the continuous production of monobasic carboxylic acid diesters of a $C_3$ vicinal glycol by the continuous oxidation with molecular oxygen of propylene in the presence of a variable valence metal cation selected from at least one member of the group consisting of tellurium, antimony, vanadium, gallium, arsenic, selenium and silver and at least one of bromine, chlorine, a bromine-containing compound yielding bromide ions during reaction or a chlorine-containing compound yielding chloride ions during reaction, said oxidation being conducted within an oxidation zone in the presence of a liquid phase reaction medium comprising the carboxylic acid and dissolved propylene, the improvement which comprises: maintaining the concentration of propylene in the liquid phase reaction medium at a level less than 0.6 wt. percent.

9. A process in accordance with claim 8 wherein the acid is acetic acid.

10. A process in accordance with claim 8 wherein the olefin concentration is maintained at a level below 0.4 wt. percent.

11. A process in accordance with claim 10 wherein the olefin concentration is maintained at a level between 0.01 wt. percent and about 0.4 wt. percent.

12. A process in accordance with claim 8 carried out in the presence of tellurium as the variable valence cation and in the presence of bromine or a bromine-containing compound.

13. A process in accordance with claim 12 wherein the acid is acetic acid.

* * * * *